G. H. WILSON.
TRACTION WHEEL.
APPLICATION FILED JAN. 16, 1914.

1,165,561.  Patented Dec. 28, 1915.

Witnesses:
Theo. Lagaard.
H. A. Bowman.

Inventor:
George H. Wilson
By his Attorney

UNITED STATES PATENT OFFICE.

GEORGE H. WILSON, OF MINNEAPOLIS, MINNESOTA.

TRACTION-WHEEL.

1,165,561. Specification of Letters Patent. Patented Dec. 28, 1915.

Application filed January 16, 1914. Serial No. 812,473.

*To all whom it may concern:*

Be it known that I, GEORGE H. WILSON, a citizen of the United States, residing at Minneapolis, in the county of Hennepin and State of Minnesota, have invented certain new and useful Improvements in Traction-Wheels, of which the following is a specification.

My invention relates to traction wheels and has for its object to provide a cleat or lug for a traction wheel which shall be simple to make, in a high degree efficient, will obviate defects inherent in known forms of cleats and lugs, and, while being strong and durable and giving a complete rolling contact to the wheel, is nevertheless provided with an edge sufficiently narrow to make effective penetration even on very hard surfaces.

The full objects and advantages of my invention will appear in connection with the detailed description thereof and are particularly pointed out in the claims.

Figure 1:
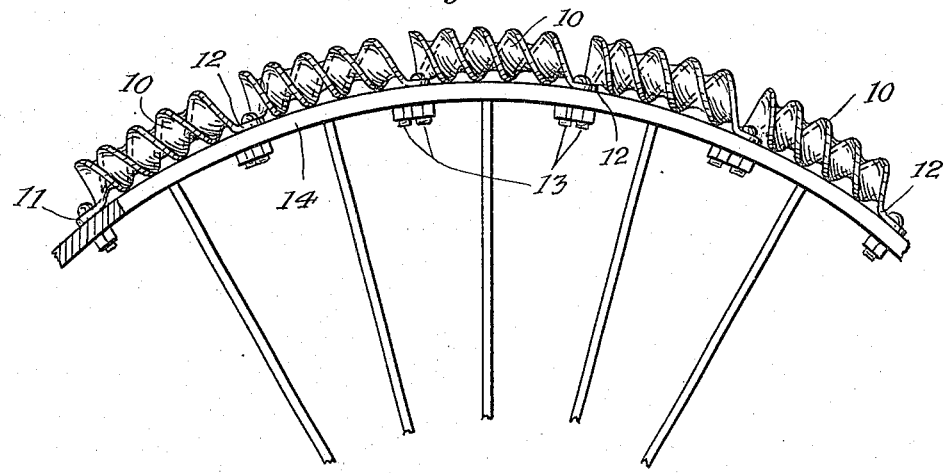
Figure 2:
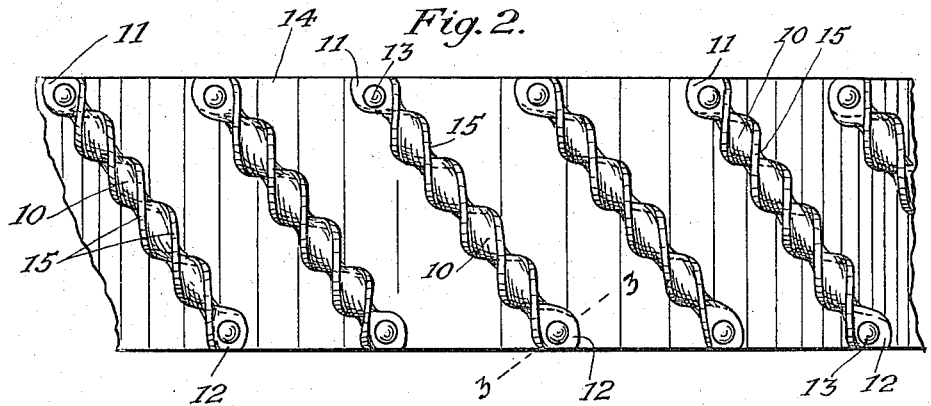
Figure 3:
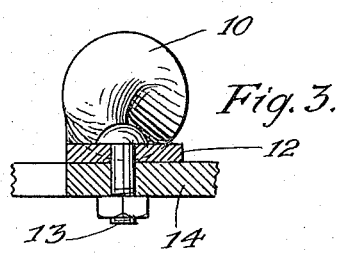

In the drawings, illustrating the application of my invention in one form,—Figure 1 is a fragment of a traction wheel showing a series of my improved cleats applied to the tire. Fig. 2 is a plan view of the parts shown in Fig. 1. Fig. 3 is an enlarged sectional view taken on line 3—3 of Fig. 2.

My lug, as shown, consists of a piece of flat metal of the desired dimensions turned into the form of a spiral 10, having ends 11 and 12 laid flat in the plane of one set of edges of the spiral, as clearly indicated in Figs. 1 and 3. By means of bolts 13 the nuts 11 and 12 are secured upon the outer face of tire 14. The bars as a whole are placed angularly along the face of the tire so as to bring the individual turns 15 at the top of the spiral in a position to extend at right angles across the face of the tire, as clearly indicated in Fig. 2. Aside from the twisting of the spirals, no forming is necessary to make the outer limits follow the curve of the wheel when the cleats are placed diagonally, as these will be brought automatically into that curve by bolting down the ends or ears 11 and 12 upon the face of the tire. It will be seen that each of the spiral cleats 10 in fact provides a multiplicity of traction lugs 15, which although extended and comparatively thin, are, nevertheless, sufficiently strong for the purpose because of the supporting character of other portions of the spiral. Furthermore, owing to the spiral character of the cleat as a whole, it is self-cleaning. The pressure exerted by the machine upon earth accumulating about the cleat will spread out and remove such earth because it does not have lateral support in either direction, as is clearly apparent from an inspection of Fig. 1. If desired, the cleats may be put so closely together that there will be no extensive gap between cleats.

It is obvious that my cleats may be made cheaply and applied to the traction wheel with facility, and that highly efficient results will be obtained from their use.

I claim:

1. In combination with the tire of a traction wheel a cleat of spiral form secured obliquely upon the face of said tire so that the upper turns of the spiral will extend transversely across the tire.

2. A traction wheel comprising a tire, a cleat formed of a flat bar twisted into a spiral form and having ears at the ends thereof in the plane of one set of elements of the spiral, said ears being bolted to the tire.

In testimony whereof I affix my signature in presence of two witnesses.

GEORGE H. WILSON.

Witnesses:
F. A. WHITELEY,
H. A. BOWMAN.

Copies of this patent may be obtained for five cents each, by addressing the "Commissioner of Patents, Washington, D. C."